(12) United States Patent
Cheng

(10) Patent No.: US 8,668,160 B2
(45) Date of Patent: *Mar. 11, 2014

(54) CABLE ORGANIZER AND ELECTRONIC APPLIANCE WITH SAME

(75) Inventor: Chin-Hung Cheng, Chino, CA (US)

(73) Assignee: Sky Tech Worldwide, Inc., Chino, CA (US)

( * ) Notice: Subject to any disclaimer, the term of this patent is extended or adjusted under 35 U.S.C. 154(b) by 249 days.

This patent is subject to a terminal disclaimer.

(21) Appl. No.: 13/310,594

(22) Filed: Dec. 2, 2011

(65) Prior Publication Data

US 2013/0140394 A1 Jun. 6, 2013

(51) Int. Cl.
*B65H 75/44* (2006.01)

(52) U.S. Cl.
USPC ............ 242/400.1; 242/404; 242/405.1; 242/406

(58) Field of Classification Search
CPC .... B65H 75/14; B65H 75/28; B65H 75/4476; B65H 75/406; B65H 2701/34; B65H 2701/3919; B65H 2701/536
USPC ........ 242/400.1, 405.1, 404, 406, 388, 388.1, 242/388.5–388.6
See application file for complete search history.

(56) References Cited

U.S. PATENT DOCUMENTS

| | | | |
|---|---|---|---|
| 6,164,582 A * | 12/2000 | Vara .............................. | 242/395 |
| 6,434,249 B1 * | 8/2002 | Wei ............................... | 381/370 |
| 2002/0117571 A1 * | 8/2002 | Scott et al. ..................... | 242/388 |
| 2007/0023559 A1 * | 2/2007 | Scapillato et al. ......... | 242/400.1 |
| 2010/0224714 A1 * | 9/2010 | Winther et al. ............ | 242/400.1 |
| 2013/0020425 A1 * | 1/2013 | Grassi et al. .................. | 242/388 |
| 2013/0114231 A1 * | 5/2013 | Cheng .......................... | 361/807 |
| 2013/0134252 A1 * | 5/2013 | Cheng ........................ | 242/405.1 |

* cited by examiner

*Primary Examiner* — Sang Kim
(74) *Attorney, Agent, or Firm* — patenttm.us

(57) ABSTRACT

A cable organizer in accordance with the present invention has a top seat, a separating plate and a base plate. The top seat has two plug slots, a winder and a longitudinal slot. The separating plate is mounted to a bottom of the winder and has a slit corresponding to and communicating with the longitudinal slot. The base plate is detachably mounted to a lower portion of the separating plate and has a spindle having a top mounted in the slit of the separating plate. The present invention also relates to an electronic appliance with the cable organizer. The electronic appliance has two sliding slots to which the base are slidably mounted, wherein the base plate has a mounting slot and the electronic appliance has a positioning bead selectively protruding from the side of the electronic appliance and detachably inserted in the mounting slot of the base plate.

12 Claims, 7 Drawing Sheets

CABLE ORGANIZER AND ELECTRONIC APPLIANCE WITH SAME

BACKGROUND OF THE INVENTION

1. Field of the Invention

The present invention relates to a cable organizer, especially to a cable organizer for winding a cable, which may be integrated into an electronic appliance.

2. Description of the Prior Art

The spreading use of portable electronic appliances has made accessories thereof, for example, rechargers, transmission cables, earphones and portable power packs, familiar in daily life. One of the accessories that are most frequently carried by the user is a transmission cable, which electronically connects a portable electronic appliance to a computer not only to transmit data but also to recharge the portable electronic appliance in order to implement practical functionalities.

However, a transmission cable of conventional technology, which has a considerable length, does not come with a proper receiving means. When being carried or in use, the conventional transmission cable is often intertwined into a messy yarn ball, which may sometimes entangle the cords of earbuds. Untying the tied up cable is an extremely frustrating burden of inconvenience.

To overcome the shortcomings, the present invention provides a cable organizer to mitigate or obviate the aforementioned problems.

SUMMARY OF THE INVENTION

The main objective of the invention is to provide a cable organizer to hold a transmission cable therewith in order to alleviate the problem of inconvenience in receiving means. The cable organizer may also be integrated into an electronic appliance for portability.

The cable organizer in accordance with the present invention has a top seat, a separating plate and a base plate. The top seat has two plug slots, a winder and a longitudinal slot. The separating plate is mounted to a bottom of the winder and has a slit corresponding to and communicating with the longitudinal slot. The base plate is detachably mounted to a lower portion of the separating plate and has a spindle having a top mounted in the slit of the separating plate.

The present invention also relates to an electronic appliance with the cable organizer. The electronic appliance has two sliding slots formed on a side of the electronic appliance, and the two opposite sides of the base are slidably mounted to the two sliding slots, wherein the base plate has a mounting slot and the electronic appliance has a positioning bead selectively protruding from the side of the electronic appliance and detachably inserted in the mounting slot of the base plate.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
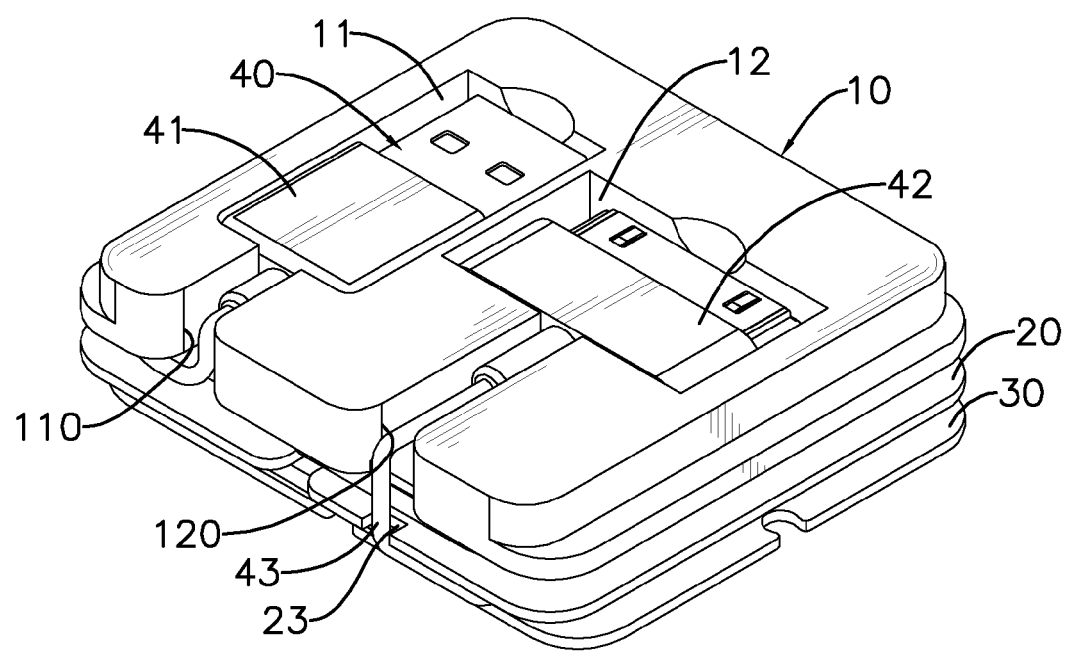
FIG. 1 is an operational perspective view of a cable organizer in accordance with the present invention.
Figure 2:
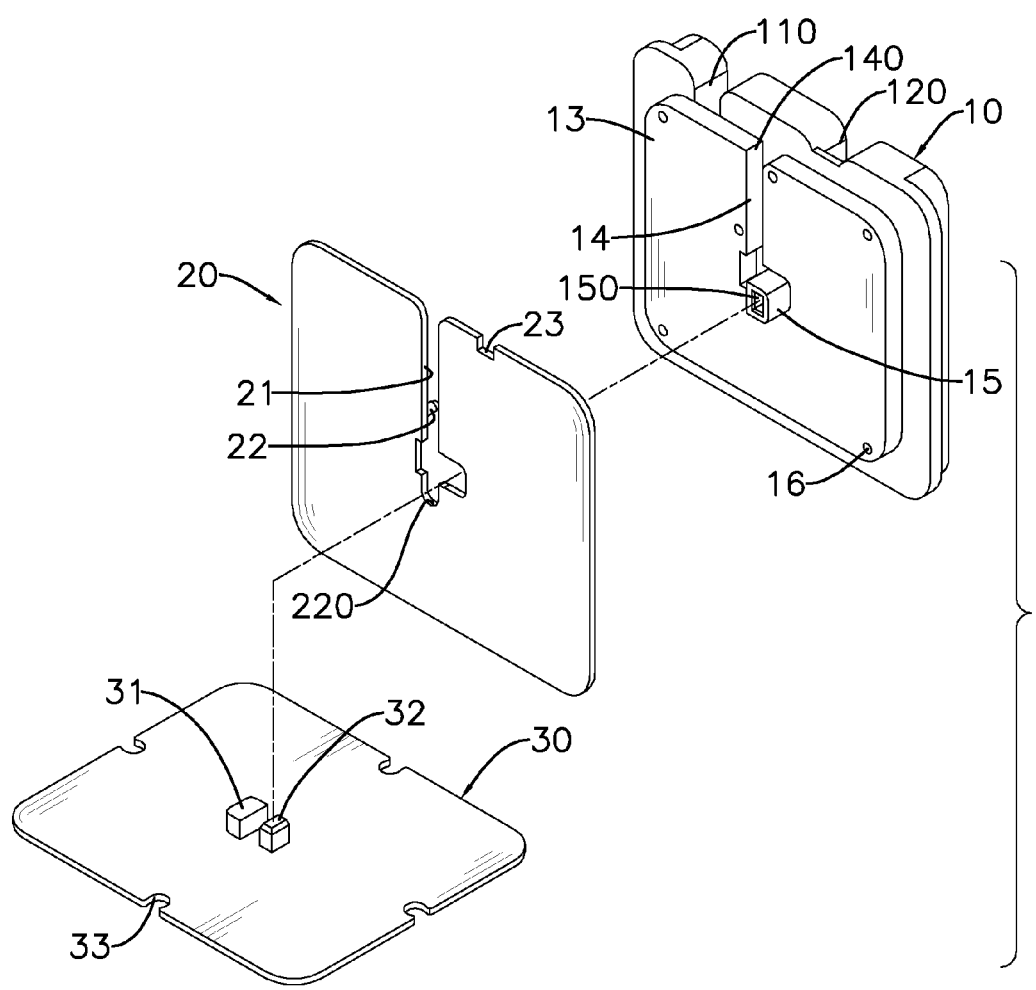
FIG. 2 is an exploded perspective view of the cable organizer in FIG. 1.

With reference to FIGS. 1 and 2, a cable organizer in accordance with the present invention is for holding a cable 40 having a plug 41, a plug 42 and a cord 43, wherein the cord 43 has two ends that are connected to the two plugs 41, 42 respectively. The cable organizer comprises a top seat 10, a separating plate 20 and a base plate 30.

The top seat 10 is a square block having plug slots 11, 12, a winder 13 and a longitudinal slot 14. The plug slot 11 and the plug slot 12 are separately recessed and formed on a top surface of the top seat 10. The plug slot 11 has an opening 110 defined through an inner slot wall of the plug slot 11 to a front sidewall of the top seat 10. The plug slot 12 has an opening 120 defined through an inner slot wall of the plug slot 12 to a front sidewall of the top seat 10.

The winder 13 is formed on a bottom portion of the top seat 10 and has an outer radius smaller than an outer radius of the top seat 10.

The longitudinal slot 14 is recessed in a bottom surface of the winder 13 and has an end penetrating through a front sidewall of the winder 13 to form an opening 140. The other end is defined in a center of the bottom surface of the winder 13.

The winder 13 further has a connector 15 protruding from the bottom surface of the winder 13 and has a connecting hole 150.

The winder 13 further has multiple mounting holes 16 formed on the bottom surface of the winder 13.

Figure 3:
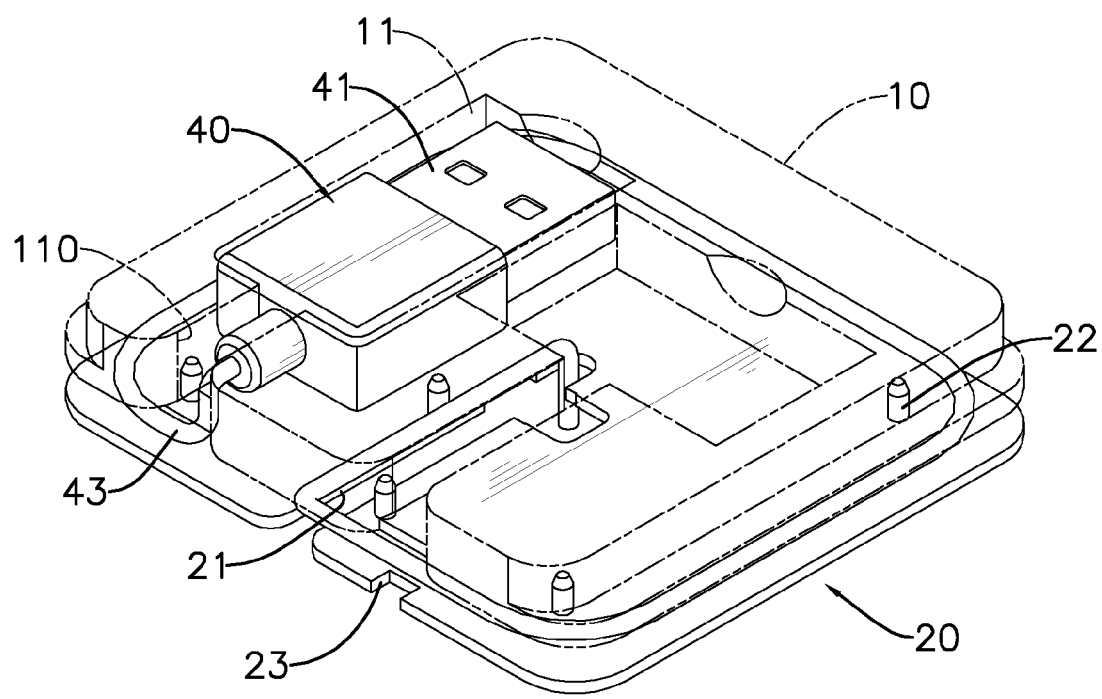
FIG. 3 is an operational perspective view of the cable organizer in FIG. 1.

With reference to FIGS. 2 and 3, the separating plate 20 is a square plate having a slit 21 and an outer radius larger than the outer radius of the winder 13. The slit 21 has an end penetrating through a front side of the separating plate 20. The other end of the slit 21 is defined in a center of the separating plate 20. The separating plate 20 has multiple mounting shafts 22 formed on a top surface of the separating plate 20 and inserted respectively in the multiple mounting holes 16 on the bottom surface of the top seat 10, so that a top surface of the separating plate 20 is connected to the bottom surface of the winder 13 in order to combine with the top seat 10. The slit 21 corresponds to and communicates with the longitudinal slot 14. The connector 15 of the top seat 10 protrudes through the slit 21 of the separating plate 20 down to below the separating plate 20. As demonstrated with the embodiment shown in the figures, the separating plate 20 has a hooking slot 23 formed on a front side of the separating plate 20 below the opening 120 of the plug slot 12.

Figure 4:
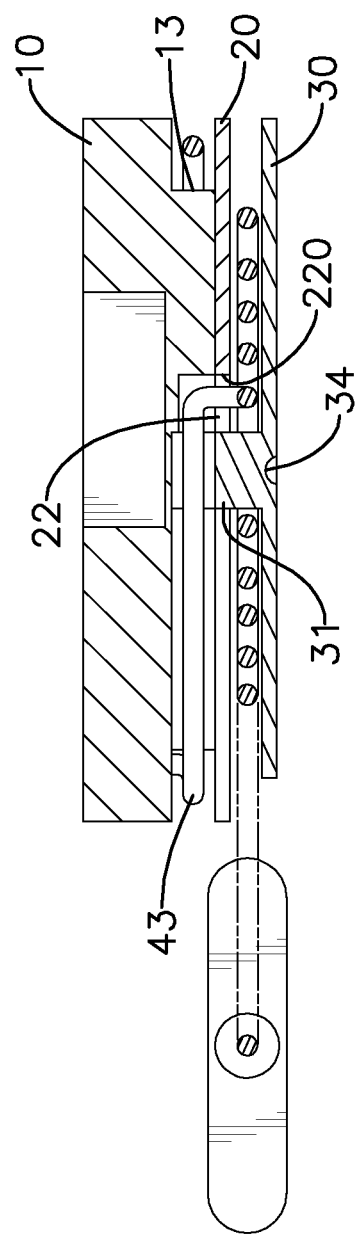
FIG. 4 is an operational side view in partial section of the cable organizer in FIG. 1.

With reference to FIG. 2, the base plate 30 is a square plate having a spindle 31 and a connecting shaft 32. The spindle 31 protrudes from the top surface of the base plate 30. The base plate 30 is detachably mounted to a lower portion of the separating plate 20, wherein the connecting shaft 32 is detachably inserted in the connecting hole 150 of the connector 15. With reference to FIG. 4, the spindle 31 has a top mounted in the other end of the slit 21 of the separating plate 20, wherein the top of the spindle 31 is a distance from a inner wall of that other end of the slit 21 of the separating plate 20.

The base plate 30 has a top surface a distance away from a bottom surface of the separating plate 20. As demonstrated with the embodiment shown in the figures, the base plate 30 has multiple positioning slots 33 recessed in a peripheral surface of the base plate 30 at intervals. With reference to FIG. 4, the base plate 30 has a mounting slot 34 recessed in the bottom surface of the base plate 30.

With reference to FIGS. 3 and 4, when the cable 40 is to be received in the cable organizer of the present invention, the base plate 30 is first removed so as to place the plug 41 in the plug slot 11. The cord 43 goes through the opening 110 and is wound around a peripheral surface of the winder 13 before going further to the longitudinal slot 14 and the slit 21, from which the cord 43 then goes by a portion 220 of the inner wall of the slit 21 to below the separating plate 20, so as to firmly hold the plug 41 in the top seat 10 and determine a portion of the cord 43 that contacts and is held between the separating plate 20 and the top seat 10.

Figure 5:
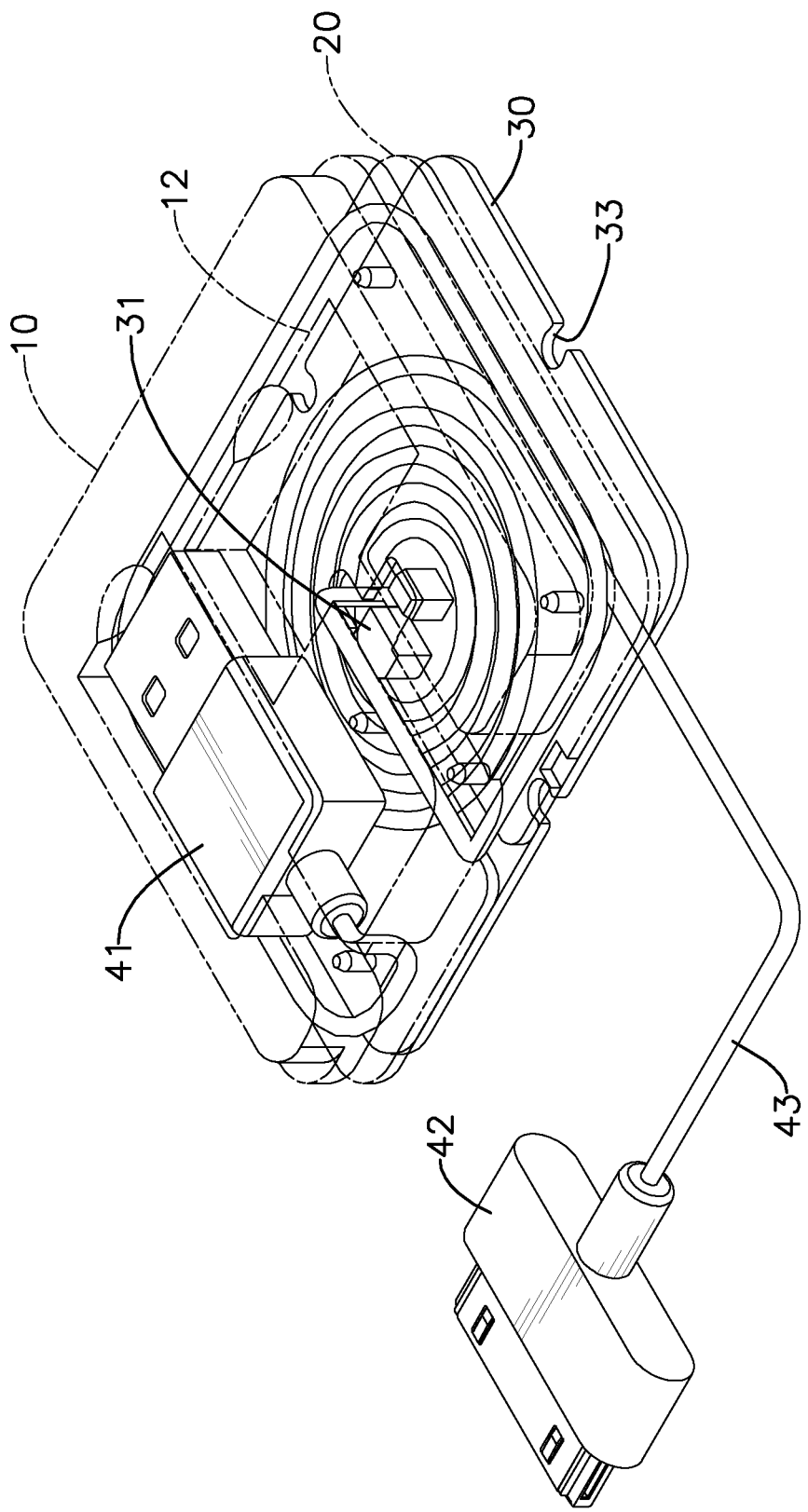
FIG. 5 is another operational perspective view of the cable organizer in FIG. 1.

With reference to FIGS. 4 and 5, the base plate 30 is then assembled below the separating plate 20 with the top of the spindle 31, so as to hold a portion of the cord 43 dangling from the portion 220 of the inner wall of the slit 21 and to wind the dangling portion of the cord 43 into a coil around a peripheral surface of the spindle between the separating plate 20 and the base plate 30. Yet another portion of the cord 43 near the plug 42 goes through the hooking slot 23 to the opening 120, in which the plug 42 is placed, to complete the organized storage of the cable 40.

When the cable 40 is to be removed from the cable organizer of the present invention, the plugs 41, 42 are first removed from the plug slots 11, 12, while the cord 43 may be positioned by being hooked at any of the positioning slots 33 of the peripheral surface of the base plate 30, so as to determine a proper movable length of the cord 43 for convenience.

Figure 6:
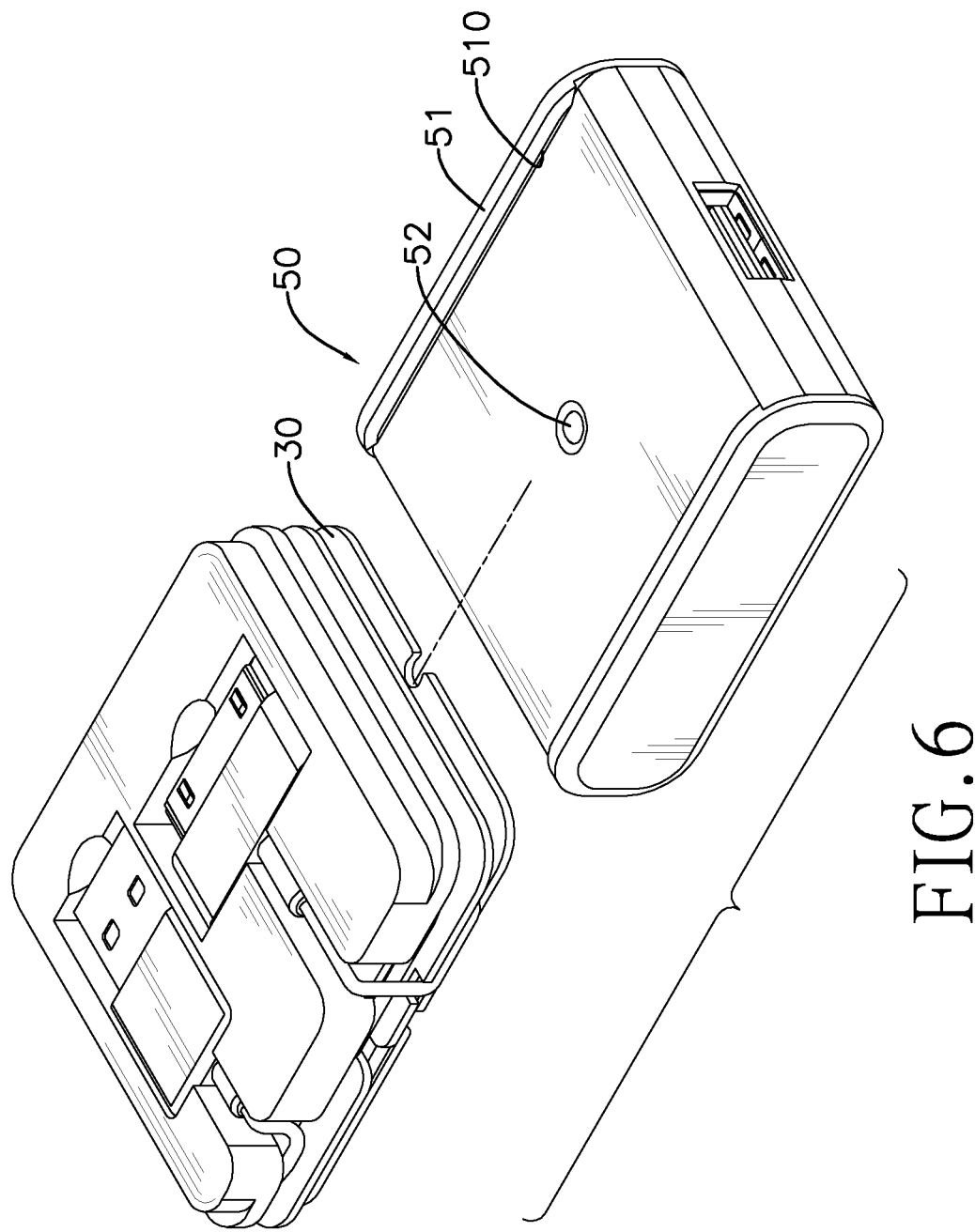
FIG. 6 is an exploded operational perspective view of an electronic appliance with the cable organizer in FIG. 1.
Figure 7:
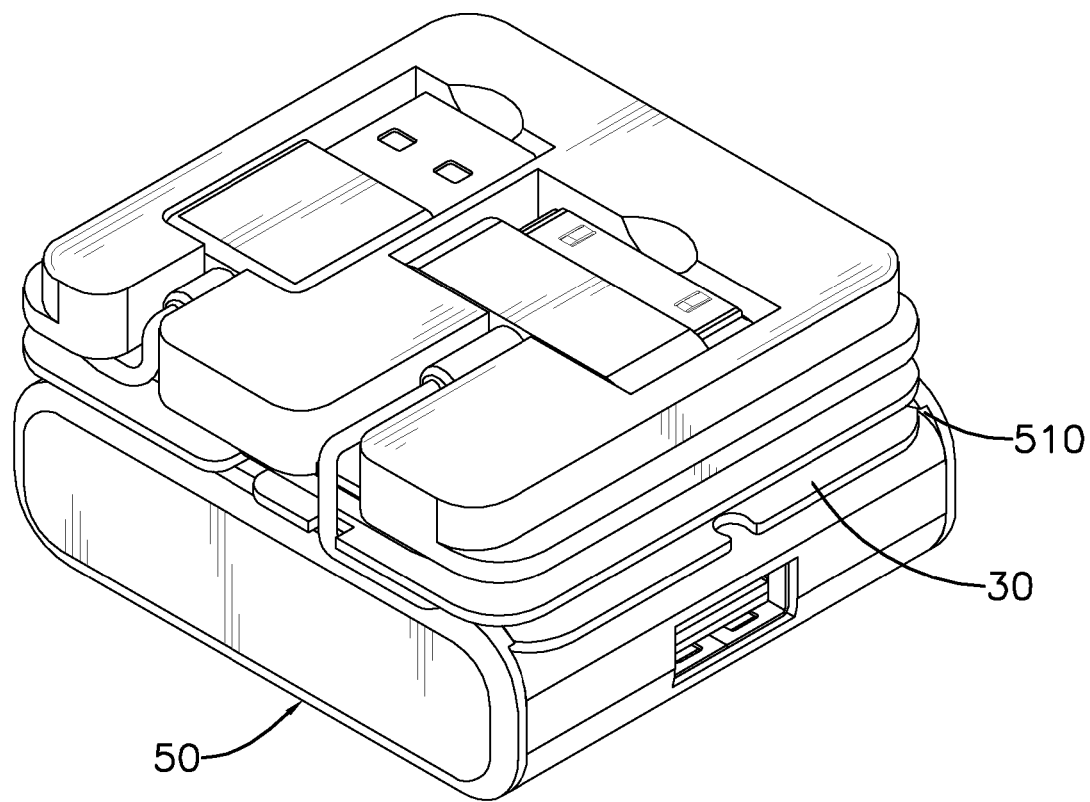
FIG. 7 is an operational perspective view of the electronic appliance in FIG. 6.

With reference to FIGS. 6 and 7, an electronic appliance 50 in accordance with the present invention implemented with the aforementioned cable organizer, which may be a portable power source or a transformer for recharging, comprises two protruding rails 51 formed on a side of the electronic appliance 50. Each protruding rail 51 has an inner sidewall and a sliding slot 510 recessed in the inner sidewall, wherein the distance between the two sliding slots 510 corresponds to the distance between of two opposite sides of the base plate 30. The electronic appliance 50 has a positioning bead 52 selectively protruding from the side of the electronic appliance. The two opposite sides of the base plate are slidably mounted to the two sliding slots 510. The positioning bead 52 is detachably inserted in the mounting slot 34 of the base plate 30 to integrate the cable organizer into the electronic appliance 50 as a convenient portable device.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A cable organizer comprising:
   a top seat having
      two plug slots separately formed on a top surface of the top seat and each having an opening defined through a sidewall of the top seat;
      a winder formed on a bottom portion of the top seat and having an outer radius smaller than an outer radius of the top seat; and
      a longitudinal slot recessed in a bottom surface of the winder and having an end penetrating through a sidewall of the winder;
   a separating plate mounted to a bottom of the winder and having
      a top surface connected to the bottom surface of the winder;
      a slit corresponding to and communicating with the longitudinal slot and having an end penetrating through a side of the separating plate; and
      an outer radius larger than the outer radius of the winder; and
   a base plate detachably mounted to a lower portion of the separating plate and having
      a top surface a distance away from a bottom surface of the separating plate;
      a spindle protruding from the top surface of the base plate and having
         a top mounted in the other end of the slit of the separating plate, wherein the top of the spindle is a distance from an inner wall of that other end of the slit of the separating plate.

2. The cable organizer as claimed in claim 1, wherein the base plate has multiple positioning slots recessed in a peripheral surface of the base plate at intervals.

3. The cable organizer as claimed in claim 2, wherein the separating plate has a hooking slot formed on a side of the separating plate below one of the plug slots.

4. The cable organizer as claimed in claim 3, wherein the other end of the longitudinal slot is defined in a center of the bottom surface of the winder; and
   the other end of the slit is defined in a center of the separating plate.

5. The cable organizer as claimed in claim 4, wherein the winder has a connector protruding downwards from the bottom surface of the winder through the separating plate and having a connecting hole; and
   the base plate has a connecting shaft formed on the top surface of the base plate detachably inserted in the connecting hole of the connector.

6. The cable organizer as claimed in claim 5, wherein the winder has multiple mounting holes formed on the bottom surface of the winder; and
   the separating plate has multiple mounting shafts formed on a top surface of the separating plate inserted in the multiple mounting holes respectively.

7. The cable organizer as claimed in claim 1, wherein the separating plate has a hooking slot formed on a side of the separating plate below one of the plug slots.

8. The cable organizer as claimed in claim 7, wherein the other end of the longitudinal slot is defined in a center of the bottom surface of the winder; and
   the other end of the slit is defined in a center of the separating plate.

9. The cable organizer as claimed in claim 8, wherein the winder has a connector protruding from the bottom surface of the winder through the separating plate down to below the separating plate and having a connecting hole; and
   the base plate has a connecting shaft formed on the top surface of the base plate and detachably inserted in the connecting hole of the connector.

10. The cable organizer as claimed in claim 9, wherein the winder has multiple mounting holes formed on the bottom surface of the winder; and the separating plate has multiple mounting shafts formed on a top surface of the separating plate inserted in the multiple mounting holes respectively.

11. An electronic appliance with the cable organizer as claimed in claim 1 comprising:
   two sliding slots formed on a side of the electronic appliance, wherein the distance between the two sliding slots corresponds to the distance between two opposite sides of the base plate; and
   the two opposite sides of the base plate are slidably mounted to the two sliding slots.

12. The electronic appliance as claimed in claim 11, wherein the base plate has a mounting slot recessed in the bottom surface of the base plate; and
   the electronic appliance has a positioning bead selectively protruding from the side of the electronic appliance and detachably inserted in the mounting slot of the base plate.

\* \* \* \* \*